United States Patent
Chaudhry

(10) Patent No.: US 6,954,347 B1
(45) Date of Patent: Oct. 11, 2005

(54) OVERVOLTAGE AND OVERCURRENT PROTECTION SYSTEM

(75) Inventor: Nisar A. Chaudhry, Huntington Station, NY (US)

(73) Assignee: TII Network Technologies, Inc., Copiague, NY (US)

( * ) Notice: Subject to any disclaimer, the term of this patent is extended or adjusted under 35 U.S.C. 154(b) by 21 days.

(21) Appl. No.: 10/672,231

(22) Filed: Sep. 25, 2003

(51) Int. Cl.⁷ .............................................. H02H 1/00
(52) U.S. Cl. ............................................. 361/119
(58) Field of Search ........................... 361/119, 111, 361/91.1

(56) References Cited

U.S. PATENT DOCUMENTS

| | | | |
|---|---|---|---|
| 4,212,047 A | 7/1980 | Napiorkowski | 361/124 |
| 4,586,104 A * | 4/1986 | Standler | 361/119 |
| 4,914,354 A * | 4/1990 | Hammer et al. | 315/247 |
| 5,742,463 A | 4/1998 | Harris | 361/58 |
| 5,790,363 A | 8/1998 | Chaudhry | 361/119 |
| 6,385,030 B1 * | 5/2002 | Beene | 361/119 |

* cited by examiner

*Primary Examiner*—Ronald Leja
(74) *Attorney, Agent, or Firm*—Morgan & Finnegan, LLP

(57) ABSTRACT

A system for protecting networks from overvoltage and overcurrent conditions.

32 Claims, 8 Drawing Sheets

OVERVOLTAGE AND OVERCURRENT PROTECTION SYSTEM

BACKGROUND OF THE INVENTION

1. Field of the Invention

The present invention relates to protecting networks from overvoltage and overcurrent conditions and, more particularly to a system for protecting Ethernet networks from overvoltage and overcurrent conditions.

2. Discussion of the Related Art

High speed data lines such as those that provide Fast-Ethernet (i.e., 10BASE-T and 100BASE-TX) and Giga-Ethernet (i.e., 10GbE) require overvoltage and overcurrent protection devices to protect incoming and outgoing signals from high level transients such as a lightening strike. Typical overvoltage and overcurrent protection devices are designed to protect against both high and low voltage surges. In addition, the overvoltage and overcurrent protection devices for high speed data lines are designed to have a low capacitance and a low insertion loss so that they may avoid attenuating the high speed data signals.

Such overvoltage and overcurrent protection devices are known in the art. For example, U.S. Pat. No. 5,790,363 issued to Nisar A. Chaudhry on Aug. 4, 1998 discloses an Ethernet overvoltage and overcurrent protection system. This system provides overvoltage and overcurrent protection to high speed data lines over lengths of approximately 300 to 500 feet. If protection is desired over greater lengths additional overvoltage and overcurrent devices must be utilized. This can be particularly cost prohibitive and burdensome to implement.

Thus, there is a need for a mechanism that effectively provides for overvoltage and overcurrent protection over greater distances and that is relatively inexpensive to implement.

SUMMARY OF THE INVENTION

The present invention overcomes the foregoing and other problems encountered in the known teachings by providing a system for protecting networks from overvoltage and overcurrent conditions over distances of 800 feet and which meets the stringent requirements of the Underwriters Laboratories Standard 497. Advantageously, the system employs capacitors configured with positive temperature coefficient resistors (PTCRs) so that their resulting impedance is low, thereby enabling overvoltage and overcurrent protection over greater distances. In addition, the capacitor/PTCR configuration eliminates the need for fuses, thereby alleviating the need to replace "blown" fuses after the system has been subject to certain high level transient activity.

In one embodiment of the present invention, an overvoltage and overcurrent protection system, comprises: a first overvoltage and overcurrent protection circuit, comprising: a first gas discharge tube including a first electrode, a second electrode and a third electrode, the third electrode connected to a ground; a first PTCR connected in series with the first electrode of the first gas discharge tube; a first capacitor connected in parallel with the first PTCR; a second PTCR connected in series with the second electrode of the first gas discharge tube; a second capacitor connected in parallel with the second PTCR; a first diode bridge connected in series with the first and second capacitors; and a first avalanche diode connected across the first diode bridge.

In another embodiment of the present invention, the overvoltage and overcurrent protection system comprises: a second overvoltage and overcurrent protection circuit, comprising: a second gas discharge tube including a fourth electrode, a fifth electrode and a sixth electrode, the sixth electrode connected to the ground; a third PTCR connected in series with the fourth electrode of the second gas discharge tube; a third capacitor connected in parallel with the third PTCR; a fourth PTCR connected in series with the fifth electrode of the second gas discharge tube; a fourth capacitor connected in parallel with the fourth PTCR; a second diode bridge connected in series with the third capacitor and the fourth capacitor; and a third avalanche diode connected across the second diode bridge.

In yet another embodiment of the present invention, a system for protecting networks from overvoltage and overcurrent conditions, comprises: a first overvoltage and overcurrent protection circuit, comprising: a first primary overvoltage protection circuit; a first secondary overvoltage protection circuit; and a first overcurrent protection circuit, wherein the first overcurrent protection circuit comprises a first capacitor in parallel with a first PTCR and a second capacitor in parallel with a second PTCR.

In another embodiment of the present invention, the system for protecting networks from overvoltage and overcurrent conditions comprises: a second overvoltage and overcurrent protection circuit, comprising: a second primary overvoltage protection circuit; a second secondary overvoltage protection circuit; and a second overcurrent protection circuit, wherein the second overcurrent protection circuit comprises a third capacitor in parallel with a third PTCR and a fourth capacitor in parallel with a fourth PTCR.

The above advantages and features are of representative embodiments only, and are presented only to assist in understanding the invention. It should be understood that they are not to be considered limitations on the invention as defined by the claims, or limitations on equivalents to the claims. For instance, some of these advantages may seem mutually contradictory, in that they cannot be simultaneously implemented in a single embodiment. Similarly, some advantages are primarily applicable to one aspect of the invention. Thus, this summary of features and advantages should not be considered dispositive in determining equivalence. Additional features and advantages of the invention will become apparent in the following description, from the drawings, and from the claims.

DESCRIPTION OF THE PREFERRED EMBODIMENTS

In the following description of the various embodiments, reference is made to the accompanying drawings which form a part hereof, and which show by way of illustration various embodiments in which the invention may be practiced. It is to be understood that other embodiments may be utilized and structural and functional modifications may be made without departing from the scope of the present invention.

Figure 1A:
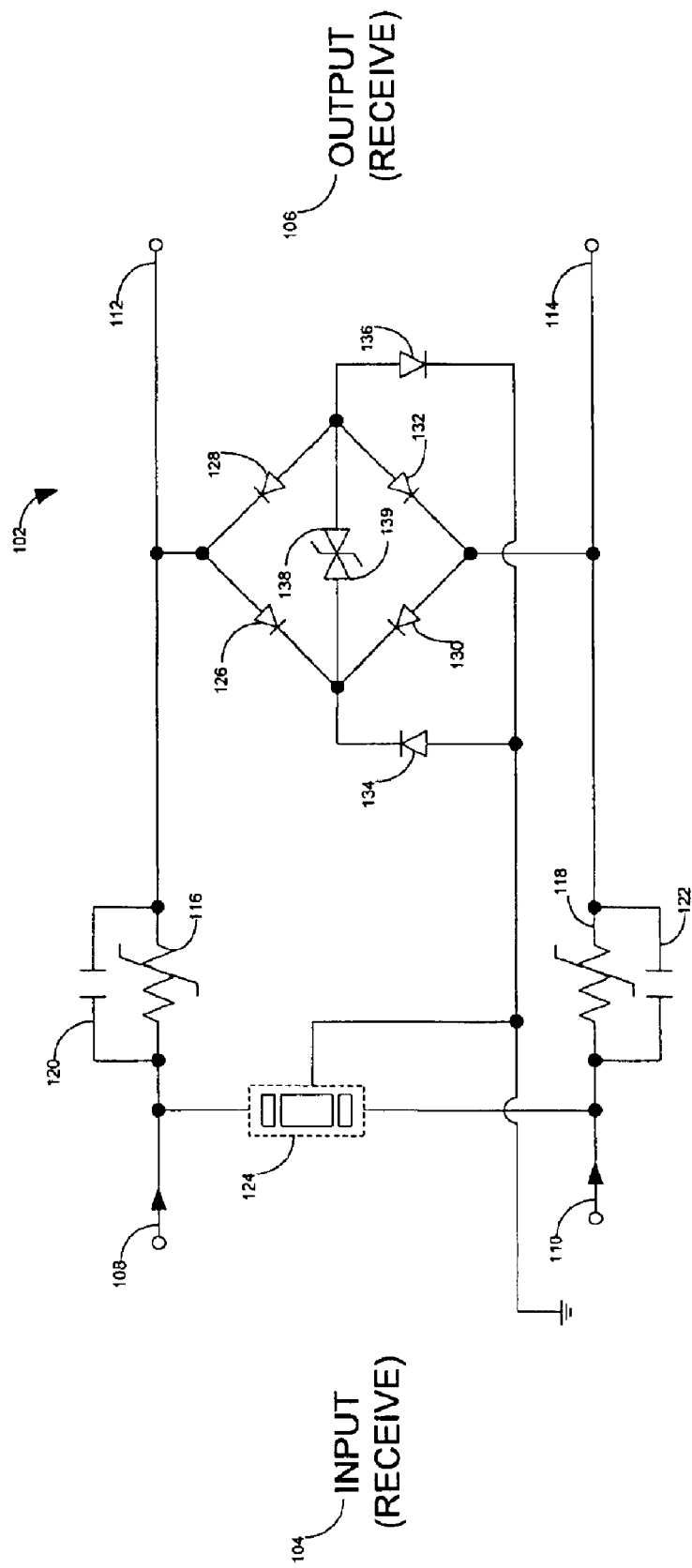
FIG. 1A is a schematic diagram of a first overvoltage and overcurrent protection circuit in accordance with the present invention.

FIG. 1A is a schematic diagram of a first overvoltage and overcurrent protection circuit in accordance with the present invention. The first overvoltage and overcurrent protection circuit 102 is adapted to be connected in series with, for example, a twisted pair of wires, coaxial cable, etc. that carry incoming digital and/or analog signals. The twisted pair of wires may be, for example, either category 3, 4 or 5 for use in a 10BASE-T Ethernet network or category 5 cabling for use in a 100BASE-TX Fast Ethernet network. The circuit 102 has an input (receive) side 104 and an output (receive) side 106. The input side 104 is configured to receive incoming digital or analog signals from a source at a pair of input terminals 108, 110. The source may be, for example, an optical network unit (ONU), a computer, a local area network (LAN) or a wide area network (WAN). The output side 106 of the circuit 102 is used to transmit the digital signals received from the source to devices or networks that are connected to the circuit 102 at a pair of output terminals 112, 114. The terminals 112, 114 may be connected to a computer, an ONU, a LAN or a WAN, etc.

In operation, the circuit 102 provides both primary and secondary overvoltage protection as well as overcurrent protection to devices or networks that are connected to it. In order to accomplish this the circuit 102 includes a primary overvoltage section, a secondary overvoltage section and an overcurrent protection section.

The primary overvoltage protection section includes a three-electrode gas discharge tube 124 that is connected across a pair of twisted wires at the input terminals 108, 110. The gas discharge tube 124 conducts when the voltage on either of the twisted wires exceeds a threshold value. The breakdown voltage of the gas discharge tube 124 may be between about 150 and about 300 volts, with a breakdown voltage of approximately 250 volts. A three-electrode gas discharge tube that may be used with the present invention is described in U.S. Pat. No. 4,212,407 to Napiorkowski, issued Jul. 8, 1980, a copy of which is herein incorporated by reference. Three-electrode gas discharge tubes that may also be used with the present invention are available from TII Industries, Inc., Copiague, N.Y. as TII 71 type or 73/75 type with a voltage breakdown range of 150–300 VDC. It is to be understood that two two-electrode gas discharge tubes may be used in lieu of a single three electrode gas discharge tube and will be discussed in detail with reference to FIGS. 4A and 4B. It is to be further understood that a thyristor may be used as an alternative to the three-electrode gas discharge tube and will be discussed in detail with reference to FIGS. 3A and 3B.

The secondary overvoltage protection section of the circuit 102 includes several diodes 126, 128, 130, 132, 134, 136 and two avalanche diodes 138, 139. The diodes 126, 128, 130, 132, 134, 136 form a diode bridge and the avalanche diodes 138, 139 are connected in series across the diode bridge. The diode bridge is connected to the overcurrent protection section (to be discussed in detail hereinafter), that is connected to a pair of twisted wires at the input terminals 108, 110. The diode bridge and the avalanche diodes 138, 139 limit the voltage coming across, for example, the twisted wires in the event that the voltage exceeds normal digital signal levels (i.e., plus or minus) five volts. The diodes 126, 128, 130, 132 may be type IN4007, 1 amp, 1000 volt PIV diodes. The diodes 134, 136 may be type RL204G, 2 amp, 1000 volt PIV diodes. The avalanche diodes 138, 139 maybe type 1.5KE12, 12 volt avalanche diodes. It is to be understood that the avalanche diodes 138, 139 may also be two series-connected low capacitance, 6 volt 1500 watt diodes such as those made by Samtech of 650 Mitchell Road, Newbury Park, Calif. 91320 and sold under part number LC01-6.

The use of the two avalanche diodes 138, 139 in series with each other is beneficial to the circuit 102. First, the surge energy handling capability of the circuit 102 doubles (i.e., the clamping voltage doubles) and, second, the capacitance of the diode bridge is halved. The use of two avalanche diodes in parallel may also increase the surge handling capability of the circuit 102. For example, the circuit 102 can handle double the amount of current when two avalanche diodes (with the clamping voltage remaining the same for each diode) are in parallel versus two diodes in series. As the use of two avalanche diodes in parallel with each other increases the surge handling capability of the circuit 102, if the diodes have different breakdown voltages, the surge handling capability of the circuit 102 is reduced to that of the diode with the highest breakdown voltage. This occurs because diodes with different breakdown voltages do not share energy equally.

Excessive positive voltages appearing at the output terminal 112 are clamped by two diodes 126, 136 and the avalanche diodes 138, 139. Excessive negative voltages appearing at terminal 112 are clamped by two diodes 128, 134 and the avalanche diodes 138, 139. Excessive positive voltages appearing at the terminal 114 are clamped by two diodes 130, 136 and the avalanche diodes 138, 139. Excessive negative voltages appearing at the terminal 114 are clamped by two diodes 132, 134 and the avalanche diodes 138, 139. If, for example, one avalanche diode is used such as a 12 volt avalanche diode, then voltages exceeding about plus or minus 15 volts would be clamped by the secondary overvoltage protection section. If, however, two 12 volt avalanche diodes are used in series (as shown in FIG. 1A), then voltages exceeding about 35 volts would be clamped by the secondary protection section. It is to be understood that avalanche diodes are available with many different breakdown voltages and the clamping voltage may be chosen by selecting suitable avalanche diodes.

The overcurrent protection section of circuit 102 includes two positive temperature coefficient resistors (PTCRs) 116, 118 and two capacitors 120, 122. The PTCR 116 and the capacitor 120 are connected in parallel with each other and are connected to the input terminal 108 at one end and the output terminal 112 at the other end. Similarly, the PTCR 118 and the capacitor 122 are connected in parallel with each other and are connected to the input terminal 110 at one end and the output terminal 114 at the other end. The PTCRs 116, 118 and the capacitors 120, 122 limit the current coming from, for example, a pair of twisted wires at the input terminals 108, 110. The PTCRs 116, 118 may be type TR600-150 that are available from Raychem Corp., Menlo Park, Calif. and may have a resistance of about eight to fourteen ohms. The configuration of the overcurrent protection section of the circuit 102 extends the overvoltage and overcurrent protection of the circuit 102 to over 800 feet. This is accomplished in part by using capacitors and PTCRs with values such that their resulting impedance is low. For example, the capacitors 120, 122 may have a capacitance value of about 0.001 microfarads to 0.1 microfarads and the PTCRs 116, 118 may have resistance values from about eight to fourteen ohms. The use of this capacitor/PTCR configuration additionally provides minimal signal loss to data transmitted in, for example, 10 BASE-T or 100BASE-TX Ethernet network.

Figure 1B:
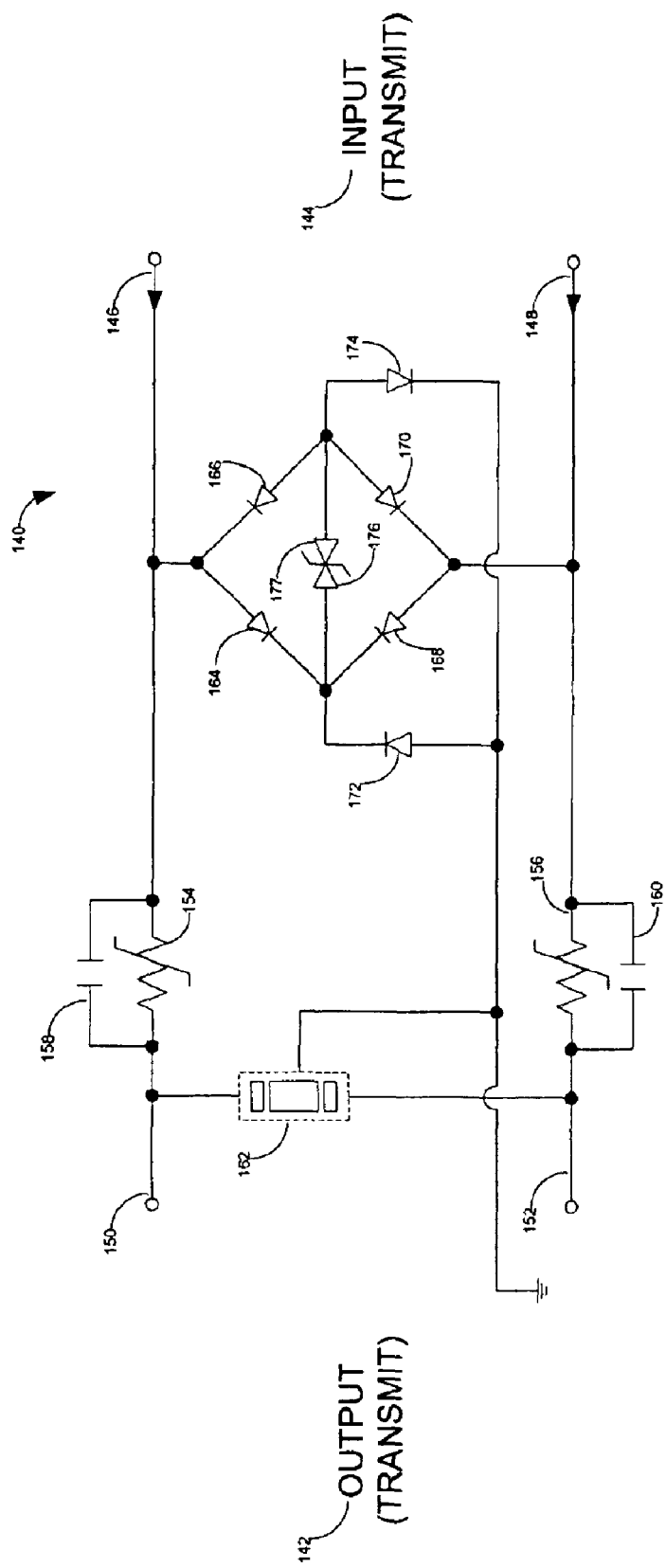
FIG. 1B is a schematic diagram of a second overvoltage and overcurrent protection circuit in accordance with the present invention.

FIG. 1B is a schematic diagram of a second overvoltage and overcurrent protection circuit in accordance with the present invention. Similar to the first overvoltage and overcurrent protection circuit 102 (as shown in FIG. 1A), the second overvoltage and overcurrent protection circuit 140 is adapted to be connected in series with, for example, a twisted pair of wires, coaxial cable, etc. that carry outgoing digital and/or analog signals. The circuit 140 has an input (transmit) side 144 and an output (transmit) side 142. The input side 144 is configured to transmit digital or analog signals from received a source at a pair of input terminals 146, 148. The source may be, for example, an ONU, a computer, a LAN or a WAN. The output side 142 of the circuit 140 is used to transmit the digital signals received from the source to devices or networks that are connected to the circuit 140 at a pair of output terminals 150, 152. The terminals 150, 152 may also be connected to a computer, an ONU, a LAN or a WAN, etc.

Similar to circuit 102, the circuit 140 provides both primary and secondary overvoltage protection as well as overcurrent protection to devices or networks that are connected to it. It is to be understood that the elements described below with reference to FIG. 1B are the same or similar to their counterpart elements in FIG. 1A.

The primary overvoltage protection section includes a three-electrode gas discharge tube 162 that is connected across a pair of twisted wires at the output terminals 150, 152. The secondary overvoltage protection section includes several diodes 164, 166, 168, 170, 172, 174 and two avalanche diodes 176, 177. The diodes 164, 166, 168, 170, 172, 174 form a diode bridge and the avalanche diodes 176, 177 are connected in series across the diode bridge. The diode bridge is connected to the overcurrent protection section (i.e., the PTCRs 154, 156 and the capacitors 158, 160), that is connected to a pair of twisted wires at the output terminals 150, 152.

Excessive positive voltages appearing at the input terminal 146 are clamped by two diodes 164, 174 and the avalanche diodes 176, 177. Excessive negative voltages appearing at terminal 146 are clamped by two diodes 166, 172 and the avalanche diodes 176, 177. Excessive positive voltages appearing at the terminal 148 are clamped by two diodes 168, 174 and the avalanche diodes 176, 177. Excessive negative voltages appearing at the terminal 148 are clamped by two diodes 170, 172 and the avalanche diodes 176, 177.

Figure 2A:
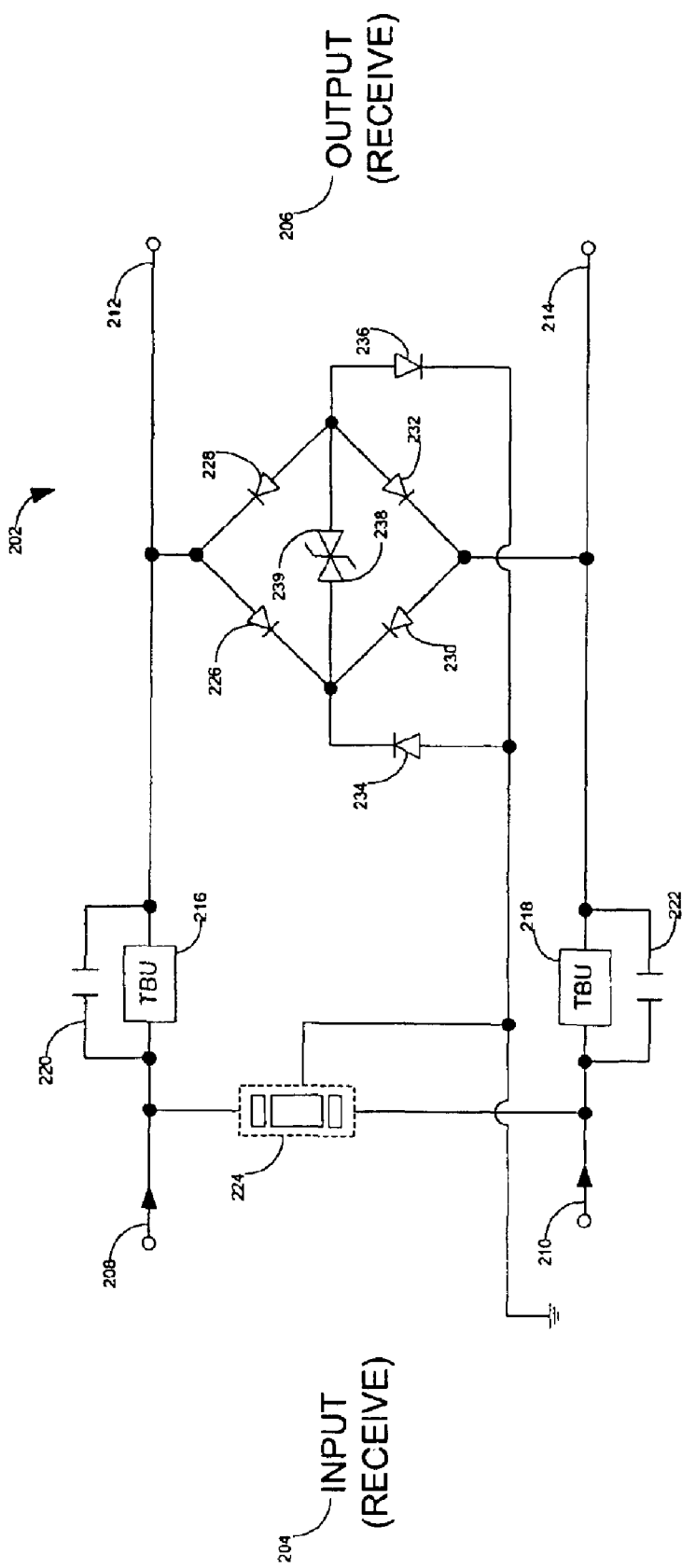
FIG. 2A is a schematic diagram of an alternative variant of the first overvoltage and overcurrent protection circuit in accordance with the present invention.

FIG. 2A is a schematic diagram of an alternative variant of the first overvoltage and overcurrent protection circuit in accordance with the present invention. The first overvoltage and overcurrent protection circuit 202 is adapted to be connected in series with, for example, a twisted pair of wires, coaxial cable, etc. that carry incoming digital and/or analog signals. The circuit 202 has an input (receive) side 204 and an output (receive) side 206. The input side 204

212, 214. The terminals 212, 214 may be connected to a computer, an ONU, a LAN or a WAN, etc.

Similar to circuit 102, the circuit 202 provides both primary and secondary overvoltage protection as well as overcurrent protection to devices or networks that are connected to it. It is to be understood that the elements described below with reference to FIG. 2A are the same or similar to their counterpart elements in FIG. 1A.

The primary overvoltage protection section includes a three-electrode gas discharge tube 224 that is connected across a pair of twisted wires at the input terminals 208, 210. The secondary overvoltage protection section of the circuit 202 includes several diodes 226, 228, 230, 232, 234, 236 and two avalanche diodes 238, 239. The diodes 226, 228, 230, 232, 234, 236 form a diode bridge and the avalanche diodes 238, 239 are connected in series across the diode bridge. The diode bridge is connected to the overcurrent protection section (to be discussed in detail hereinafter), that is connected to a pair of twisted wires at the input terminals 208, 210.

The overcurrent protection section of circuit 202 includes two transient blocking units (TBUs) (i.e., an overcurrent protection element that goes into high impedance mode when its current exceeds a preset limit) 216, 218 and two capacitors 220, 222. The TBU 216 and the capacitor 220 are connected in parallel with each other and are connected to the input terminal 208 at one end and the output terminal 212 at the other end. Similarly, the TBU 218 and the capacitor 222 are connected in parallel with each other and are connected to the input terminal 210 at one end and the output terminal 214 at the other end. The TBUs 216, 218 and the capacitors 220, 222 limit the current coming from, for example, a pair of twisted wires at the input terminals 208, 210. A TBU that may be used with the present invention is described in U.S. Pat. No. 5,742,463 to Harris, issued Apr. 21, 1998, a copy of which is herein incorporated by reference. TBUs that may also be used with the present invention are available from Fultec Pty Ltd., 101 Hyde Rd., Brisbane Q4104, Australia.

Figure 2B:
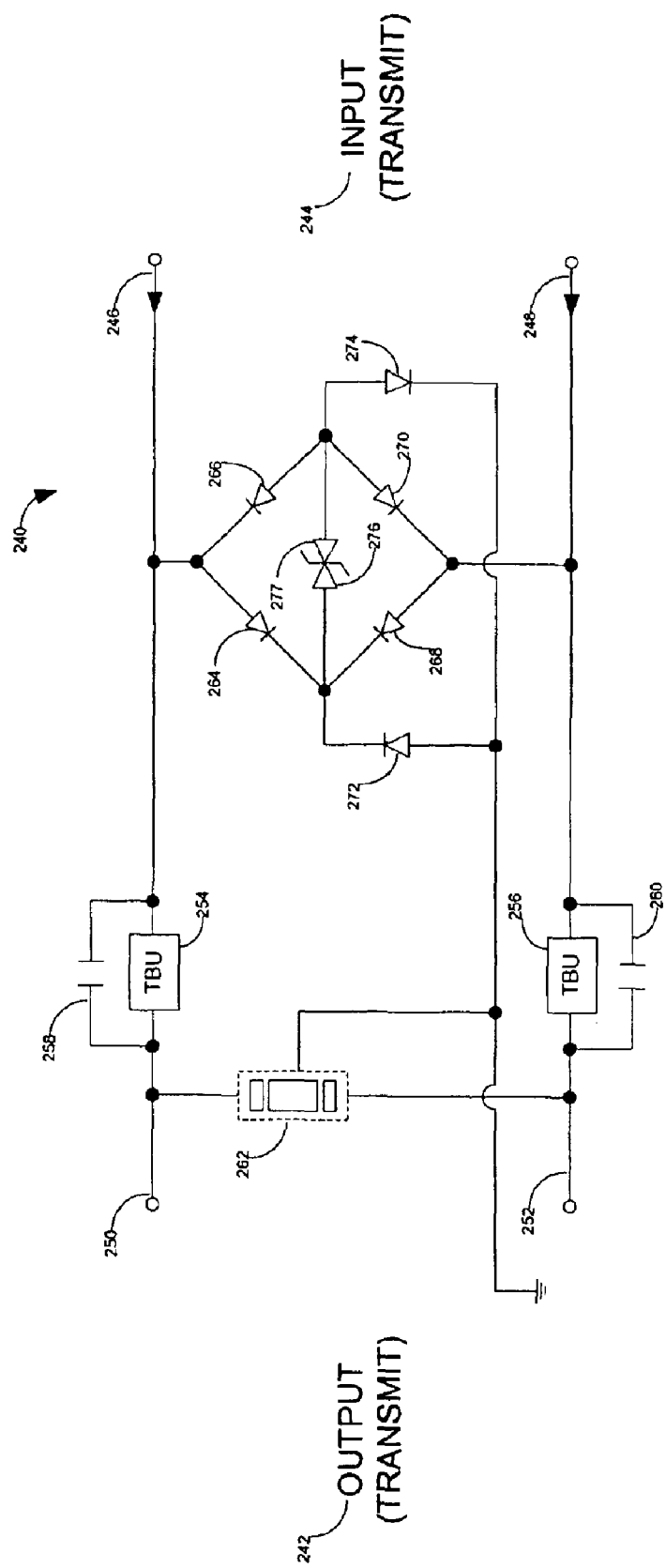
FIG. 2B is a schematic diagram of an alternative variant of the second overvoltage and overcurrent protection circuit in accordance with the present invention.

FIG. 2B is a schematic diagram of an alternative variant of the second overvoltage and overcurrent protection circuit in accordance with the present invention. The second overvoltage and overcurrent protection circuit 240 is adapted to be connected in series with, for example, a twisted pair of wires, coaxial cable, etc. that carry incoming digital and/or analog signals. The circuit 240 has an input (transmit) side 244 and an output (transmit) side 242. The input side 244 is configured to transmit digital or analog signals received from a source at a pair of input terminals 246, 248. The source may be, for example, an ONU, a computer, a LAN or a WAN. The output side 242 of the circuit 240 is used to transmit the digital signals received from the source to devices or networks that are connected to the circuit 240 at a pair of output terminals 250, 252. The terminals 250, 252 may be connected to a computer, an ONU, a LAN or a WAN, etc.

Similar to circuit 140 (as shown in FIG. 1B), the circuit 240 provides both primary and secondary overvoltage protection as well as overcurrent protection to devices or networks that are connected to it. It is to be understood that the elements described below with reference to FIG. 2B are the same or similar to their counterpart elements in FIG. 1B.

The primary overvoltage protection section includes a three-electrode gas discharge tube 262 that is connected across a pair of twisted wires at the output terminals 250, 252. The secondary overvoltage protection section of the circuit 240 includes several diodes 264, 266, 268, 270, 272, 274 and two avalanche diodes 276, 277. The diodes 264, 266, 268, 270, 272, 274 form a diode bridge and the avalanche diodes 276, 277 are connected in series across the diode bridge. The diode bridge is connected to the overcurrent protection section (i.e., the TBUs 254, 256 and the capacitors 258, 260), that is connected to a pair of twisted wires at the output terminals 250, 252. The overcurrent protection section of circuit 240 includes two TBUs 254, 256 and two capacitors 258, 260.

Figure 3A:
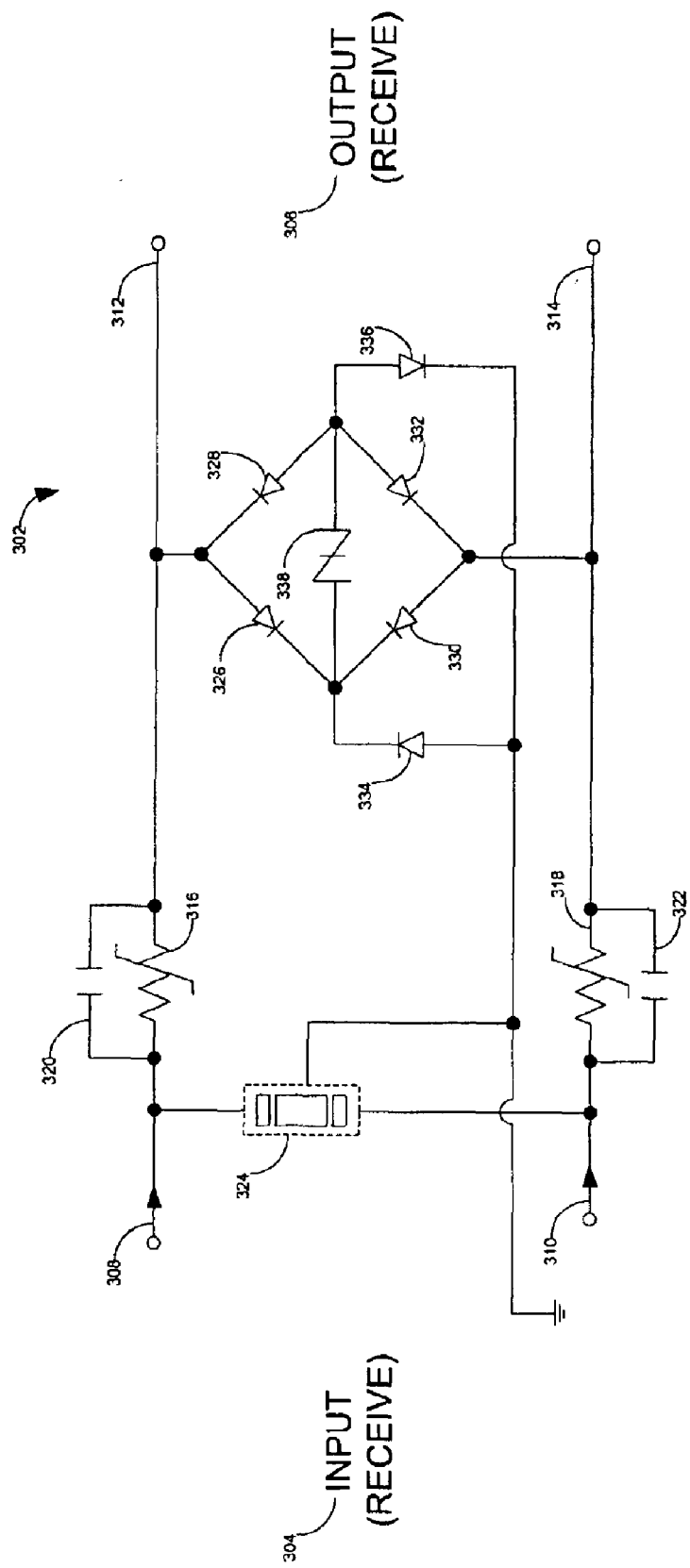
FIG. 3A is a schematic diagram of an alternative variant of the first overvoltage and overcurrent protection circuit in accordance with the present invention.

FIG. 3A is a schematic diagram of an alternative variant of the first overvoltage and overcurrent protection circuit in accordance with the present invention. The first overvoltage and overcurrent protection circuit 302 is adapted to be connected in series with, for example, a twisted pair of wires, coaxial cable, etc. that carry incoming digital and/or analog signals. The circuit 302 has an input (receive) side 304 and an output (receive) side 306. The input side 304 is configured to receive incoming digital or analog signals from a source at a pair of input terminals 308, 310. The source may be, for example, an ONU, a computer, a LAN or a WAN. The output side 306 of the circuit 302 is used to transmit the digital signals received from the source to devices or networks that are connected to the circuit 302 at a pair of output terminals 312, 314. The terminals 312, 314 may be connected to a computer, an ONU, a LAN or a WAN, etc.

Similar to circuit 102, the circuit 302 provides both primary and secondary overvoltage protection as well as overcurrent protection to devices or networks that are connected to it. It is to be understood that the elements described below with reference to FIG. 3A are the same or similar to their counterpart elements in FIG. 1A.

The primary overvoltage protection section includes a three-electrode gas discharge tube 324 that is connected across a pair of twisted wires at the input terminals 308, 310. The secondary overvoltage protection section of the circuit 302 includes several diodes 326, 328, 330, 332, 334, 336 and a thyristor 338. The diodes 326, 328, 330, 332, 334, 336 form a diode bridge and the thyristor 338 is connected in series across the diode bridge. The diode bridge is connected to the overcurrent protection section (i.e., the PTCRs 316, 318 and the capacitors 320, 322), that is connected to a pair of twisted wires at the input terminals 308, 310. The diode bridge and the thyristor 338 limit the voltage coming across, for example, the twisted pair of wires in the event that the voltage exceeds normal digital signal levels (i.e., plus or minus) five volts.

Excessive positive voltages appearing at the output terminal 312 are clamped by two diodes 326, 336 and the thyristor 338. Excessive negative voltages appearing at terminal 312 are clamped by two diodes 328, 334 and the thyristor 338. Excessive positive voltages appearing at the terminal 314 are clamped by two diodes 330, 336 and the thyristor 338. Excessive negative voltages appearing at the terminal 314 are clamped by two diodes 332, 334 and the thyristor 338.

Thyristors may be used in lieu of avalanche diodes because they also protect electrical circuits from disturbances caused by lightening induced surges, inductive coupled spikes and AC power cross conditions. The use of thyristors provides several benefits: 1) they cannot be damaged by voltage, 2) they eliminate overshoot caused by eliminate voltage overshoot caused by fast rising transients, and (3) they have low capacitance, making them ideal for high speed transmission equipment. Thyristor 338 may be SIDACtor® type made by Teccor Electronics and sold under part number P0300EC.

Figure 3B:
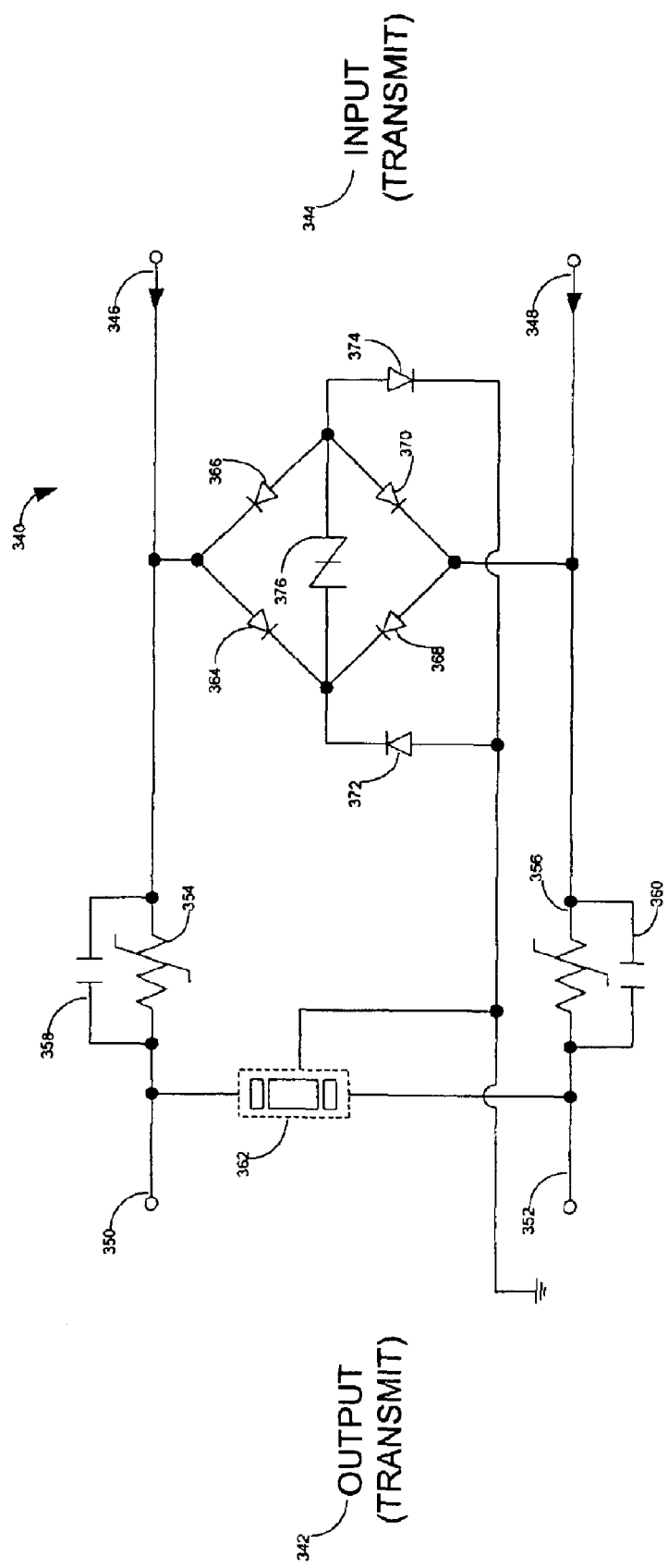
FIG. 3B is a schematic diagram of an alternative variant of the second overvoltage and overcurrent protection circuit in accordance with the present invention.

FIG. 3B is a schematic diagram of an alternative variant of the second overvoltage and overcurrent protection circuit in accordance with the present invention. Similar to the first overvoltage and overcurrent protection circuit 302 (as shown in FIG. 3A), the second overvoltage and overcurrent protection circuit 340 is adapted to be connected in series with, for example, a twisted pair of wires, coaxial cable, etc. that carry outgoing digital and/or analog signals. The circuit 340 has an input (transmit) side 344 and an output (transmit) side 342. The input side 344 is configured to transmit digital or analog signals from received a source at a pair of input terminals 346, 348. The source may be, for example, an ONU, a computer, a LAN or a WAN. The output side 342 of the circuit 340 is used to transmit the digital signals received from the source to devices or networks that are connected to the circuit 340 at a pair of output terminals 350, 352. The terminals 350, 352 may also be connected to a computer, an ONU, a LAN or a WAN, etc.

Similar to circuit 302, the circuit 340 provides both primary and secondary overvoltage protection as well as overcurrent protection to devices or networks that are connected to it. It is to be understood that the elements described below with reference to FIG. 3B are the same or similar to their counterpart elements in FIG. 3A.

The primary overvoltage protection section includes a three-electrode gas discharge tube 362 that is connected across a pair of twisted wires at the output terminals 350, 352. The secondary overvoltage protection section includes several diodes 364, 366, 368, 370, 372, 374 and a thyristor 376. The diodes 364, 366, 368, 370, 372, 374 form a diode bridge and the thyristor 376 is connected in series across the diode bridge. The diode bridge is connected to the overcurrent protection section (i.e., the PTCRs 354, 356 and the capacitors 358, 360), that is connected to a pair of twisted wires at the output terminals 350, 352.

Excessive positive voltages appearing at the input terminal 346 are clamped by two diodes 364, 374 and the thyristor 376. Excessive negative voltages appearing at terminal 346 are clamped by two diodes 366, 372 and the thyristor 376. Excessive positive voltages appearing at the terminal 348 are clamped by two diodes 368, 374 and the thyristor 376. Excessive negative voltages appearing at the terminal 348 are clamped by two diodes 370, 372 and the thyristor 376.

Figure 4A:
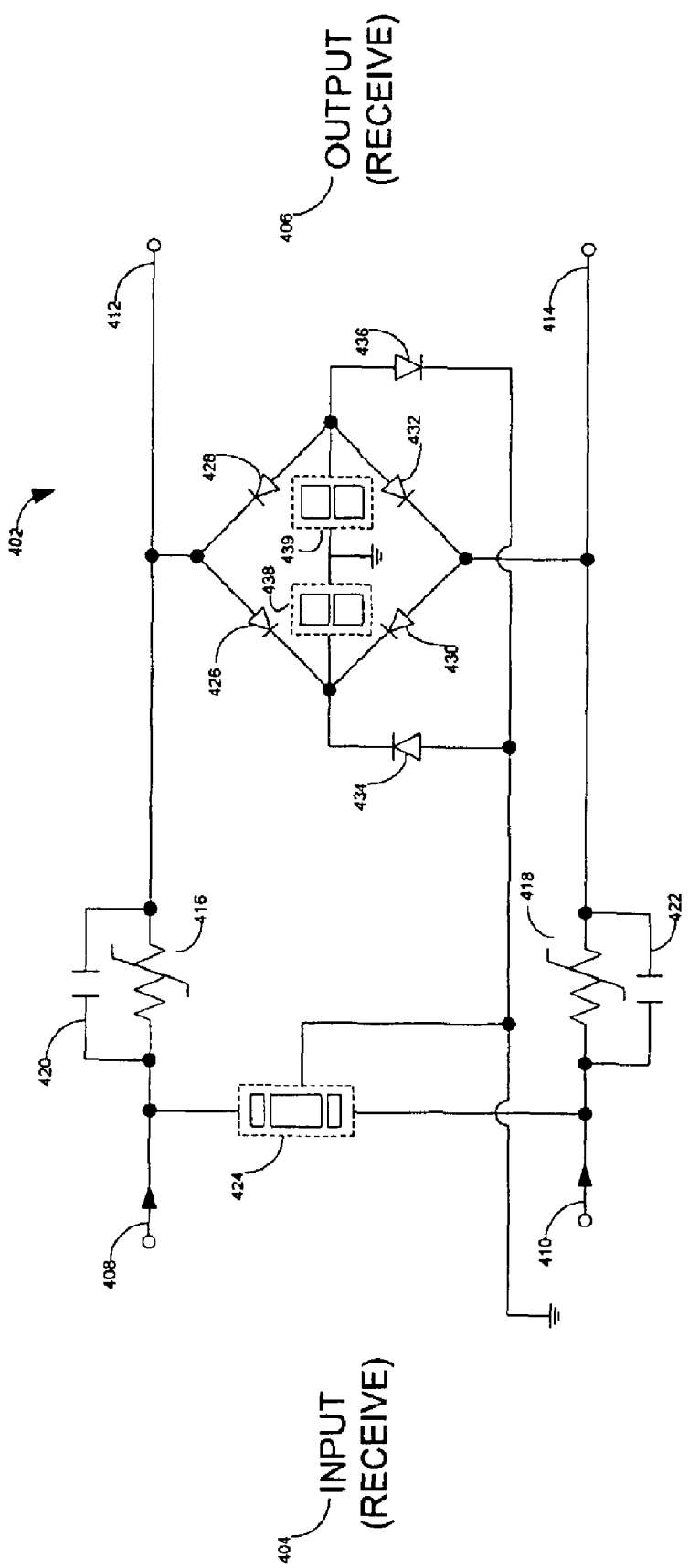
FIG. 4A is a schematic diagram of an alternative variant of the first overvoltage and overcurrent protection circuit in accordance with the present invention.

FIG. 4A is a schematic diagram of an alternative variant of the first overvoltage and overcurrent protection circuit in accordance with the present invention. The first overvoltage and overcurrent protection circuit 402 is adapted to be connected in series with, for example, a twisted pair of wires, coaxial cable, etc. that carry incoming digital and/or analog signals. The circuit 402 has an input (receive) side 404 and an output (receive) side 406. The input side 404 is configured to receive incoming digital or analog signals from a source at a pair of input terminals 408, 410. The source may be, for example, an ONU, a computer, a LAN or a WAN. The output side 406 of the circuit 402 is used to transmit the digital signals received from the source to devices or networks that are connected to the circuit 402 at a pair of output terminals 412, 414. The terminals 412, 414 may be connected to a computer, an ONU, a LAN or a WAN, etc.

Similar to circuit 302, the circuit 402 provides both primary and secondary overvoltage protection as well as overcurrent protection to devices or networks that are connected to it. It is to be understood that the elements described below with reference to FIG. 4A are the same or similar to their counterpart elements in FIG. 3A.

The primary overvoltage protection section includes a three-electrode gas discharge tube 424 that is connected across a pair of twisted wires at the input terminals 408, 410. The secondary overvoltage protection section of the circuit 402 includes several diodes 426, 428, 430, 432, 434, 436 and two two-electrode gas discharge tubes 438, 439 connected in series with each other. The diodes 426, 428, 430, 432, 434, 436 form a diode bridge and the two two-electrode gas discharge tubes 438, 439 are connected in series across the diode bridge. The diode bridge is connected to the overcurrent protection section (i.e., the PTCRs 416, 418 and the capacitors 420, 422), that is connected to a pair of twisted wires at the input terminals 408, 410. The diode bridge and the two two-electrode gas discharge tubes 438, 439 limit the voltage coming across, for example, the twisted wires in the event that the voltage exceeds normal digital signal levels (i.e., plus or minus) five volts.

Excessive positive voltages appearing at the output terminal 412 are clamped by two diodes 426, 436 and the two two-electrode gas discharge tubes 438, 439. Excessive negative voltages appearing at terminal 412 are clamped by two diodes 428, 434 and the two twoelectrode gas discharge tubes 438, 439. Excessive positive voltages appearing at the terminal 414 are clamped by two diodes 430,436 and the two two-electrode gas discharge tubes 438, 439. Excessive negative voltages appearing at the terminal 414 are clamped by two diodes 432, 434 and the two two-electrode gas discharge tubes 438, 439.

Figure 4B:
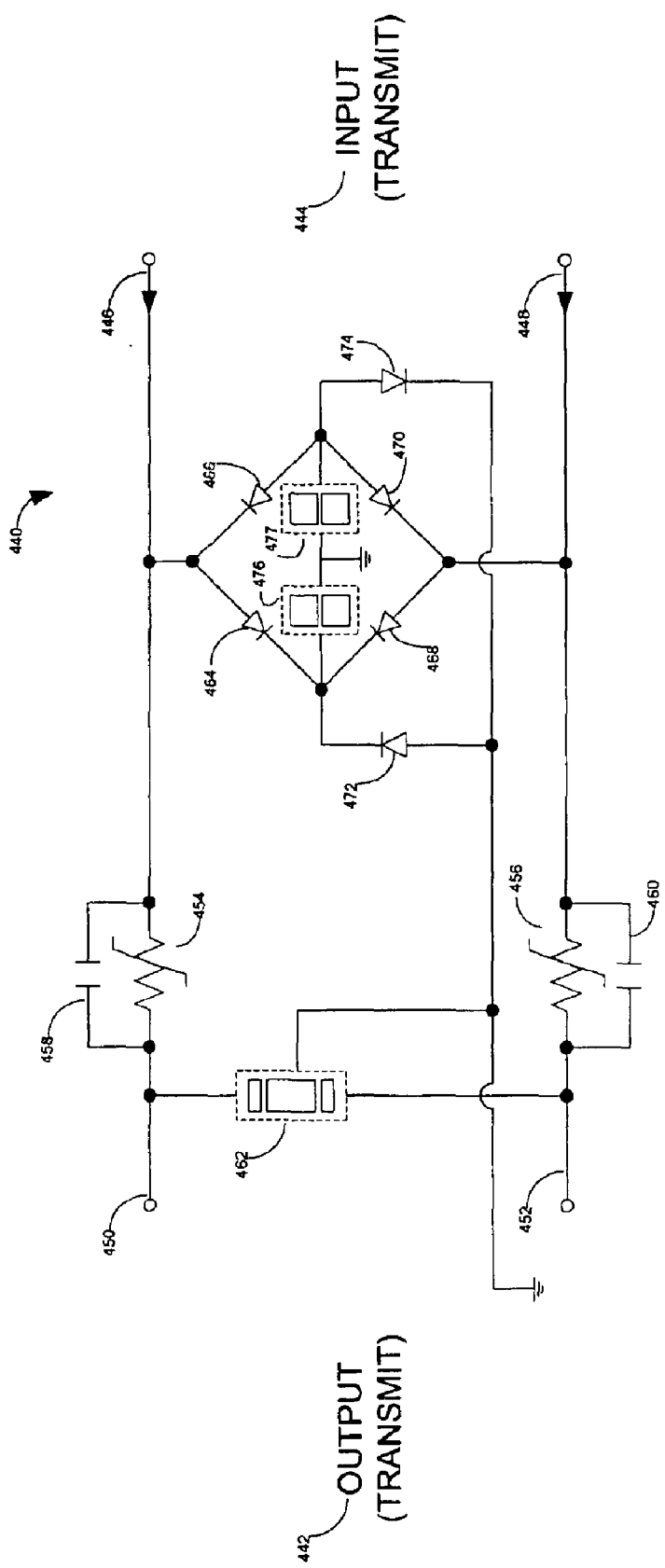
FIG. 4B is a schematic diagram of an alternative variant of the second overvoltage and overcurrent protection circuit in accordance with the present invention.

FIG. 4B is a schematic diagram of an alternative variant of the second overvoltage and overcurrent protection circuit in accordance with the present invention. Similar to the first overvoltage and overcurrent protection circuit 402 (as shown in FIG. 4A), the second overvoltage and overcurrent protection circuit 440 is adapted to be connected in series with, for example, a twisted pair of wires, coaxial cable, etc. that carry outgoing digital and/or analog signals. The circuit 440 has an input (transmit) side 444 and an output (transmit) side 442. The input side 444 is configured to transmit digital or analog signals from received a source at a pair of input terminals 446, 448. The source may be, for example, an ONU, a computer, a LAN or a WAN. The output side 442 of the circuit 440 is used to transmit the digital signals received from the source to devices or networks that are connected to the circuit 440 at a pair of output terminals 450, 452. The terminals 450, 452 may also be connected to a computer, an ONU, a LAN or a WAN, etc.

Similar to circuit 402, the circuit 440 provides both primary and secondary overvoltage protection as well as overcurrent protection to devices or networks that are connected to it. It is to be understood that the elements described below with reference to FIG. 4B are the same or similar to their counterpart elements in FIG. 3B.

The primary overvoltage protection section includes a three-electrode gas discharge tube 462 that is connected across a pair of twisted wires at the output terminals 450, 452. The secondary overvoltage protection section includes several diodes 464, 466, 468, 470, 472, 474 and two two-electrode gas discharge tubes 476, 477 connected in series with each other. The diodes 464, 466, 468, 470, 472, 474 form a diode bridge and the two two-electrode gas discharge tubes 476, 477 are connected in series across the diode bridge. The diode bridge is connected to the overcurrent protection section (i.e., the PTCRs 454, 456 and the capacitors 458, 460), that is connected to a pair of twisted wires at the output terminals 450, 452.

Excessive positive voltages appearing at the input terminal 446 are clamped by two diodes 464, 474 and the two two-electrode gas discharge tubes 476, 477. Excessive negative voltages appearing at terminal 446 are clamped by two diodes 466, 472 and the two two-electrode gas discharge tubes 476, 477. Excessive positive voltages appearing at the terminal 448 are clamped by two diodes 468, 474 and the two two-electrode gas discharge tubes 476, 477. Excessive negative voltages appearing at the terminal 448 are clamped by two diodes 470, 472 and the two two-electrode gas discharge tubes 476, 477.

It should be understood that the above description is only representative of illustrative embodiments. For the convenience of the reader, the above description has focused on a representative sample of possible embodiments, a sample that is illustrative of the principles of the present invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. Other applications and embodiments can be conceived by those without departing from the spirit and scope of the present invention. It is therefore intended, that the invention is not to be limited to the disclosed embodiments but is to be defined in accordance with the claims that follow. It can be appreciated that many of those undescribed embodiments are within the scope of the following claims, and others are equivalent.

What is claimed is:

1. An overvoltage and overcurrent protection system, comprising:
    a first overvoltage and overcurrent protection circuit, comprising:
        a first gas discharge tube including a first electrode, a second electrode and a third electrode, the third electrode connected to a ground;
        a first positive temperature coefficient resistor (PTCR) connected in series with the first electrode of the first gas discharge tube;
        a first capacitor connected in parallel with the first PTCR;
        a second PTCR connected in series with the second electrode of the first gas discharge tube;
        a second capacitor connected in parallel with the second PTCR;
        a first diode bridge connected in series with the first and second capacitors; and
        a first avalanche diode connected across the first diode bridge.

2. The overvoltage and overcurrent protection system of claim 1, wherein the first diode bridge includes a first diode, a second diode, a third diode, a fourth diode, a fifth diode, and a sixth diode.

3. The overvoltage and overcurrent protection system of claim 1, further comprising:
    a second avalanche diode connected in series with the first avalanche diode across the first diode bridge.

4. The overvoltage and overcurrent protection system of claim 1, further comprising:
    a terminal for receiving incoming signals from an input source.

5. The overvoltage and overcurrent protection system of claim 4, wherein the terminal is configured to connect to one of a twisted pair of wires or a coaxial cable.

6. The overvoltage and overcurrent protection system of claim 1, further comprising:

a terminal for transmitting incoming signals to an output source.

7. The overvoltage and overcurrent protection system of claim 6, wherein the terminal is configured to connect to one of a twisted pair of wires or a coaxial cable.

8. The overvoltage and overcurrent protection system of claim 1, further comprising:
a second overvoltage and overcurrent protection circuit, comprising:
a second gas discharge tube including a fourth electrode, a fifth electrode and a sixth electrode, the sixth electrode connected to the ground;
a third PTCR connected in series with the fourth electrode of the second gas discharge tube;
a third capacitor connected in parallel with the third PTCR;
a fourth PTCR connected in series with the fifth electrode of the second gas discharge tube;
a fourth capacitor connected in parallel with the fourth PTCR;
a second diode bridge connected in series with the third capacitor and the fourth capacitor, and
a third avalanche diode connected across the second diode bridge.

9. The overvoltage and overcurrent protection system of claim 8, wherein the second diode bridge includes a seventh diode, an eighth diode, a ninth diode, a tenth diode, an eleventh diode, and a twelfth diode.

10. The overvoltage and overcurrent protection circuit of claim 8, further comprising:
a fourth avalanche diode connected in series with the third avalanche diode across the second diode bridge.

11. The overvoltage and overcurrent protection system of claim 8, further comprising:
a terminal for receiving outgoing signals from an input source.

12. The overvoltage and overcurrent protection system of claim 11, wherein the terminal is configured to connect to one of a twisted pair of wires or a coaxial cable.

13. The overvoltage and overcurrent protection system of claim 8, further comprising:
a terminal for transmitting outgoing signals to an output source.

14. The overvoltage and overcurrent protection system of claim 13, wherein the terminal is configured to connect to one of a twisted pair of wires or a coaxial cable.

15. An overvoltage and overcurrent protection system, comprising:
a first overvoltage and overcurrent protection circuit, comprising:
a first gas discharge tube including a first electrode, a second electrode and a third electrode, the third electrode connected to a ground;
a first transient blocking unit (TBU) connected in series with the first electrode of the first gas discharge tube;
a first capacitor connected in parallel with the first TBU;
a second TBU connected in series with the second electrode of the first gas discharge tube;
a second capacitor connected in parallel with the second TBU;
a first diode bridge connected in series with the first and second capacitors; and
a first avalanche diode connected across the first diode bridge.

16. The overvoltage and overcurrent protection system of claim 15, further comprising:

a second avalanche diode connected in series with the first avalanche diode across the first diode bridge.

17. The overvoltage and overcurrent protection system of claim 15, further comprising:
a second overvoltage and overcurrent protection circuit, comprising:
a second gas discharge tube including a fourth electrode, a fifth electrode and a sixth electrode, the sixth electrode connected to the ground;
a third TBU connected in series with the fourth electrode of the second gas discharge tube;
a third capacitor connected in parallel with the third TBU;
a fourth TBU connected in series with the fifth electrode of the second gas discharge tube;
a fourth capacitor connected in parallel with the fourth TBU;
a second diode bridge connected in series with the third capacitor and the fourth capacitor; and
a third avalanche diode connected across the second diode bridge.

18. The overvoltage and overcurrent protection circuit of claim 17, further comprising:
a fourth avalanche diode connected in series with the third avalanche diode across the second diode bridge.

19. An overvoltage and overcurrent protection system, comprising:
a first overvoltage and overcurrent protection circuit, comprising:
a first gas discharge tube including a first electrode, a second electrode and a third electrode, the third electrode connected to a ground;
a first PTCR connected in series with the first electrode of the first gas discharge tube;
a first capacitor connected in parallel with the first PTCR;
a second PTCR connected in series with the second electrode of the first gas discharge tube;
a second capacitor connected in parallel with the second PTCR;
a first diode bridge connected in series with the first and second capacitors; and
a first thyristor connected across the first diode bridge.

20. The overvoltage and overcurrent protection system of claim 19, further comprising:
a second overvoltage and overcurrent protection circuit, comprising:
a second gas discharge tube including a fourth electrode, a fifth electrode and a sixth electrode, the sixth electrode connected to the ground;
a third PTCR connected in series with the fourth electrode of the second gas discharge tube;
a third capacitor connected in parallel with the third PTCR;
a fourth PTCR connected in series with the fifth electrode of the second gas discharge tube;
a fourth capacitor connected in parallel with the fourth PTCR;
a second diode bridge connected in series with the third capacitor and the fourth capacitor; and
a second thyristor connected across the second diode bridge.

21. An overvoltage and overcurrent protection system, comprising:
a first overvoltage and overcurrent protection circuit, comprising:

a first gas discharge tube including a first electrode, a second electrode and a third electrode, the third electrode connected to a ground;

a first PTCR connected in series with the first electrode of the first gas discharge tube;

a first capacitor connected in parallel with the first PTCR;

a second PTCR connected in series with the second electrode of the first gas discharge tube;

a second capacitor connected in parallel with the second PTCR;

a first diode bridge connected in series with the first and second capacitors; and a first two-electrode gas discharge tube and a second two-electrode gas discharge tube connected across the first diode bridge.

22. The overvoltage and overcurrent protection system of claim 21, further comprising:

a second overvoltage and overcurrent protection circuit, comprising:

a second gas discharge tube including a fourth electrode, a fifth electrode and a sixth electrode, the sixth electrode connected to the ground;

a third PTCR connected in series with the fourth electrode of the second gas discharge tube;

a third capacitor connected in parallel with the third PTCR;

a fourth PTCR connected in series with the fifth electrode of the second gas discharge tube;

a fourth capacitor connected in parallel with the fourth PTCR;

a second diode bridge connected in series with the third capacitor and the fourth capacitor, and a third two-electrode gas discharge tube and a fourth two-electrode gas discharge tube connected across the second diode bridge.

23. A system for protecting networks for overvoltage and overcurrent conditions, comprising:

a first overvoltage and overcurrent protection circuit, comprising:

a first primary overvoltage protection circuit;

a first secondary overvoltage protection circuit; and a first overcurrent protection circuit, wherein the first overcurrent protection circuit comprises a first capacitor in parallel with a first PTCR and a second capacitor in parallel with a second PTCR.

24. The system of claim 23, wherein the first primary overvoltage protection circuit comprises a gas discharge tube.

25. The system of claim 23, wherein the first secondary overvoltage protection circuit comprises a diode bridge and a first avalanche diode connected across the diode bridge.

26. The system of claim 25, further comprising a second avalanche diode connected across the diode bridge.

27. The system of claim 23, wherein the network is an Ethernet network.

28. The system of claim 23, further comprising:

a second overvoltage and overcurrent protection circuit, comprising:

a second primary overvoltage protection circuit;

a second secondary overvoltage protection circuit; and a second overcurrent protection circuit, wherein the second overcurrent protection circuit comprises a third capacitor in parallel with a third PTCR and a fourth capacitor in parallel with a fourth PTCR.

29. The system of claim 28, wherein the second primary overvoltage protection circuit comprises a gas discharge tube.

30. The system of claim 28, wherein the second secondary overvoltage protection circuit comprises a diode bridge and a third avalanche diode connected across the diode bridge.

31. The system of claim 30, further comprising a fourth avalanche diode connected across the diode bridge.

32. The system of claim 28, wherein the network is an Ethernet network.

* * * * *